(12) United States Patent
Sharifzadeh et al.

(10) Patent No.: US 9,858,589 B2
(45) Date of Patent: Jan. 2, 2018

(54) MEASURING SEARCH LIFT RESULTED BY ONLINE ADVERTISEMENT

(71) Applicant: Google Inc., Mountain View, CA (US)

(72) Inventors: Mehdi Sharifzadeh, Los Angeles, CA (US); Oren E. Zamir, Los Altos, CA (US); Troy L. Walker, Los Angeles, CA (US); Dan Blandford, Mountain View, CA (US); Radoslav M. Kirov, San Francisco, CA (US); Jeff Bergman, Monterey Park, CA (US); Sanaz Ahari, Bellevue, WA (US)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 14/053,735

(22) Filed: Oct. 15, 2013

(65) Prior Publication Data

US 2014/0297398 A1    Oct. 2, 2014

(30) Foreign Application Priority Data

Apr. 2, 2013   (IL) .......................................... 225500

(51) Int. Cl.
  *G06Q 30/00*   (2012.01)
  *G06Q 30/02*   (2012.01)
(52) U.S. Cl.
  CPC ................ *G06Q 30/0243* (2013.01)
(58) Field of Classification Search
  None
  See application file for complete search history.

(56) References Cited

U.S. PATENT DOCUMENTS 7,689,626 B2   3/2010  Miller et al.
8,364,682 B1   1/2013  Gershony et al.
(Continued)

FOREIGN PATENT DOCUMENTS

JP          2007108952 A  *  4/2007  ............. G06F 13/00
KR    10-2009-0001871      1/2009
(Continued)

OTHER PUBLICATIONS

HIPAA. Guidance Regarding Methods for De-identification of Protected Health Information in Accordance with the Health Insurance Portability and Accountability Act (HIPAA) Privacy Rule (Nov. 26, 2012). Retrieved online Sep. 11, 2017.*
(Continued)

*Primary Examiner* — James A Reagan
(74) *Attorney, Agent, or Firm* — Foley & Lardner LLP (57) ABSTRACT

Methods, systems, and apparatus include computer programs encoded on a computer-readable storage medium for measuring lift. A method includes: receiving requests for content for which a first content item is an eligible content item; delivering the first content item along with a first pixel that identifies the delivery of the first content item to a first portion of the received requests; delivering a second, different content item along with a second pixel that identifies the non-delivery of the first content item to a second portion of the received plurality of requests rather than the first content item; evaluating searches performed by users that received the first content item as compared to users that received the second content item including using the first pixel and second pixel in evaluating search logs associated with search requests performed by users; and presenting lift data to a sponsor associated with the first content item.

16 Claims, 6 Drawing Sheets

(56) References Cited

U.S. PATENT DOCUMENTS

| | | |
|---|---|---|
| 8,386,398 B1 | 2/2013 | Hickman |
| 2007/0260519 A1* | 11/2007 | Sattley .................. G06Q 30/02 705/14.41 |
| 2008/0033806 A1 | 2/2008 | Howe et al. |
| 2009/0119259 A1 | 5/2009 | Williams et al. |
| 2013/0014189 A1* | 1/2013 | Rosenberg ............. G06Q 30/06 725/105 |

FOREIGN PATENT DOCUMENTS

| | | | |
|---|---|---|---|
| KR | 1020090001871 | 1/2009 | |
| WO | WO 0128273 A1 * | 4/2001 | ......... H04L 63/0407 |
| WO | WO2008070745 A3 | 6/2008 | |

OTHER PUBLICATIONS

International Search Report and Written Opinion in International Application No. PCT/US2014/032727, dated Jul. 29, 2014, 12 pages.

Papadimitriou et al., "Display Advertising Impact: Search Lift and Social Influence," [retrieved on Jan. 30, 2014]. Retrieved from the internet: URL<http://ilpubs.stanford.edu:8090/993/2/displayadinfluenceTR.pdf>, 10 pages.

International Search Report & Written Opinion on PCT/US2014/032727 dated Jul. 29, 2014.

* cited by examiner

Lift Report

Content Sponsor: XYZ Cars
Campaign: Campaign #110       } 452
Time Period: 3/1/13 – 3/31/13

⌒ 454

Exposed Users: Users who were presented content items in the campaign at least two times.
Control Users: Users presented some other content item

San Francisco

| | Exposed | Control |
|---|---|---|
| Probability of performing related search within 60 days: | 8% | 3% |
| Average search volume per user: | 4 | 2 |
| Users first time searching for XYZ Cars: | 122 | 34 |

456 } (Exposed column), 458 } (Control column)

San Diego

| | Exposed | Control |
|---|---|---|
| Probability of performing related search within 60 days: | 7% | 4% |
| Average search volume per user: | 3 | 1.5 |
| Users first time searching for XYZ Cars: | 111 | 22 |

460 } (Exposed column), 462 } (Control column)

MEASURING SEARCH LIFT RESULTED BY ONLINE ADVERTISEMENT

CROSS-REFERENCE TO RELATED APPLICATION

This application claims priority to Israel Application Serial No. 225500, filed on Apr. 2, 2013, the entire contents of which are hereby incorporated by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for measuring lift. The method comprises: receiving a plurality of requests for content for which a first content item is an eligible content item and for which the first content item is responsive to each of the respective requests; determining to deliver the first content item responsive to a first portion of the received plurality of requests, and delivering the first content item along with a first pixel that identifies the delivery of the first content item; determining to deliver a second different content item responsive to a second portion of the received plurality of requests rather than the first content item and delivering the second different content item along with a second pixel that identifies the non-delivery of the first content item; evaluating searches performed by users that received the first content item as compared to users that received the second different content item including using the first pixel and second pixel in evaluating search logs associated with search requests performed by users; and presenting lift data to a sponsor associated with the first content item based at least in part on the evaluating.

In general, another aspect of the subject matter described in this specification can be implemented in computer program products. A computer program product is tangibly embodied in a computer-readable storage device and comprises instructions. The instructions, when executed by a processor, cause the processor to: receive a plurality of requests for content for which a first content item is an eligible content item and for which the first content item is responsive to each of the respective requests; determine to deliver the first content item responsive to a first portion of the received plurality of requests, and deliver the first content item along with a first pixel that identifies the delivery of the first content item; determine to deliver a second different content item responsive to a second portion of the received plurality of requests rather than the first content item and deliver the second different content item along with a second pixel that identifies the non-delivery of the first content item; evaluate searches performed by users that received the first content item as compared to users that received the second different content item including using the first pixel and second pixel in evaluating search logs associated with search requests performed by users; and present lift data to a sponsor associated with the first content item based at least in part on the evaluating.

In general, another aspect of the subject matter described in this specification can be implemented in systems. A system includes a content management system and a search system. the content management system is configured to: receive a plurality of requests for content for which a first content item is an eligible content item and for which the first content item is responsive to each of the respective requests; determine to deliver the first content item responsive to a first portion of the received plurality of requests, and deliver the first content item along with a first pixel that identifies the delivery of the first content item; and determine to deliver a second different content item responsive to a second portion of the received plurality of requests rather than the first content item and deliver the second different content item along with a second pixel that identifies the non-delivery of the first content item. The search system is configured to: evaluate searches performed by users that received the first content item as compared to users that received the second different content item including using the first pixel and second pixel in evaluating search logs associated with search requests performed by users; and present lift data to a sponsor associated with the first content item based at least in part on the evaluating.

These and other implementations can each optionally include one or more of the following features. The first content item can be a brand content item and the slot that is to present the first content item can be associated with a display advertisement. The first and the second content items can be advertisements. Determining to deliver the first content item and second content item can include a predetermined number of deliveries in a time period specified by the sponsor. Evaluating searches can include evaluating searches performed after delivery or non-delivery of the first content item. Evaluating searches can include evaluating pre-delivery searches performed prior to delivery or non-delivery and comparing the pre-delivery searches with searches performed after delivery or non-delivery of the first content item. Using the first pixel and the second pixel can include providing pixel data along with a cookie when a user performs a search after delivery of a given pixel. The pixel data can include metadata related to the first content item and whether or not the first content item was displayed to a respective user previously. The metadata can include an identifier for the first content item and an indicator as to whether the first content item was delivered. Using the first and second pixels can include evaluating search logs for searches performed by a user identified using the first or second pixel. A user interface can be provided for receipt of campaign parameters associated with the first content item. An indication to include the first content item in a lift analysis along with data related to the lift analysis can be received. The campaign parameters can include keywords for evaluating lift in the searches performed by users that were delivered or not delivered the first content item.

Particular implementations may realize none, one or more of the following advantages. A brand content provider can be provided a measure of effectiveness of a brand content campaign. Lift occurring on a search system can be measured by using, in part, information received from a content system, where the information from the content system does not include identifiers of users on the content system. Effectiveness of content campaigns managed by a content system can be measured while respecting privacy of users of the content system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content provider, such as a brand content provider (e.g., brand advertiser) can desire to know the effectiveness of a content campaign managed by a content system. A brand content provider may not be able to accurately measure effectiveness based on such metrics as click through rates and conversions, since brand content items may be oriented towards brand awareness and may not be configured for activities such as online conversions. A brand content provider can receive a measure of effectiveness for a brand content campaign based, for example, on whether users who have been presented brand content items increase activity related to the content provider on another system, such as a search system. An increase in activity can be referred to as "lift". Lift occurring on a search system can be measured, for example, by using information received from the content system. Lift can be measured while respecting privacy of users of the content system. For example, information can be shared between the search system and the content system without the search system being aware of user identifying information associated with the content system.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
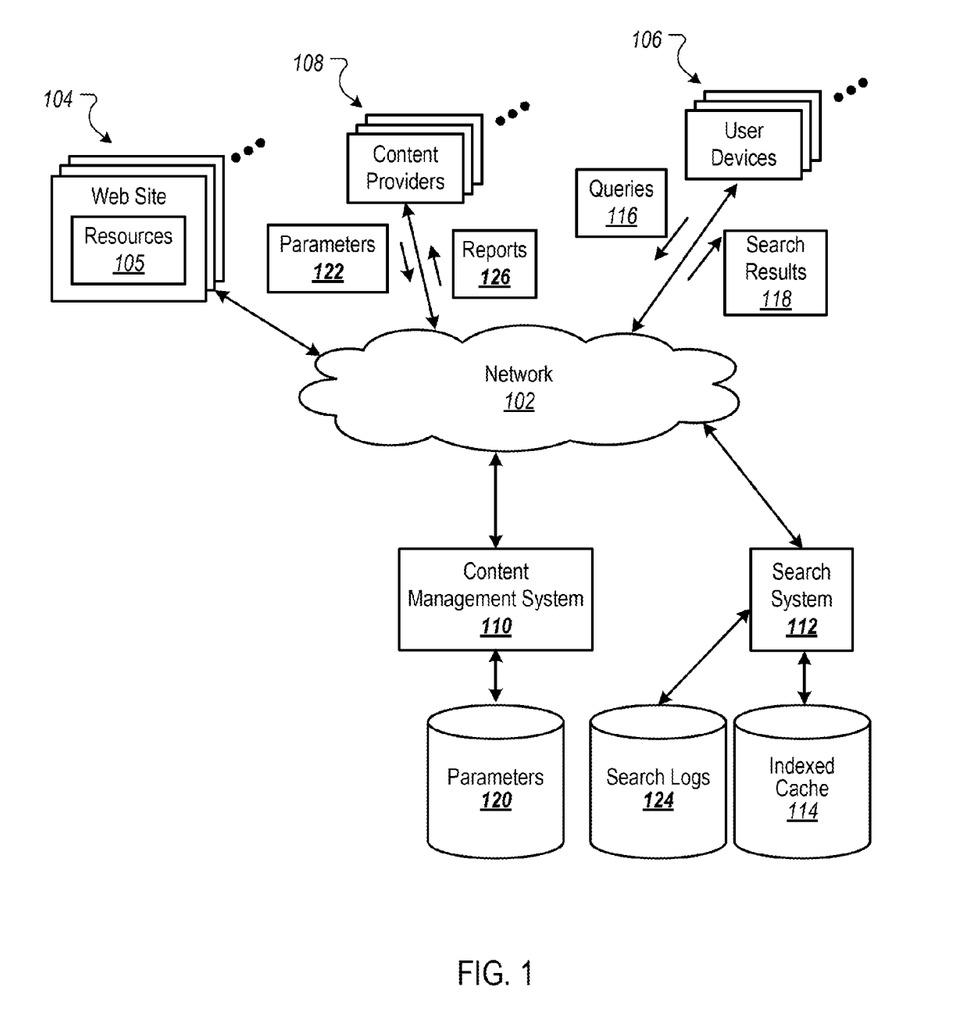
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, and a content management system 110. The example environment 100 may include many thousands of websites 104, user devices 106, and content providers 108. The content management system 110 may be used for selecting and providing content in response to requests for content. The content providers 108 can be, for example, advertisers, such as brand advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116.

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110. One or more selected content items can be provided to the user device 106 in association with providing an associated resource 105 or search results 118.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

In some implementations, some content providers 108 prefer that the number of impressions allocated to their content and the price paid for the number of impressions be more predictable than the predictability provided by an auction. For example, a content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms.

The campaign parameters 120 can also include an indication that the content provider 108 designated a content campaign for a lift analysis. As part of a lift analysis for the content provider 108, the content management system 110 can determine to deliver a campaign content item to a first portion of received requests for content for which the campaign content item is an eligible content item and can determine to not deliver the campaign content item to a second portion of the received requests. For the first portion, the content management system 110 can deliver the campaign content item to the requesting user device 106 along with a first element (e.g., tracking pixel) that identifies the delivery of the campaign content item. For the second portion, the content management system 110 can deliver a different content item (e.g., associated with a different content provider 108) to the requesting user device 106 along with a second element (e.g., another pixel) which identifies non-delivery of the campaign content item.

To determine lift for the content campaign, a system (e.g., the search system 112) can evaluate interactions (e.g., searches) performed by users that received the campaign content item as compared to users that received a different content item. The search system 112 can, for example, determine aggregate lift data based on occurrences of the first pixel and the second pixel in search logs 124. In some implementations, the search system 112 can determine such aggregate lift data without accessing user-identifying information associated with the content management system 110.

The search system 112 (or the content management system 110 or other system) can present the aggregate lift data to the content provider 108, such as in one or more reports 126. The reports 126 can indicate, for example, whether users in general change behavior (e.g., search behavior) after being presented campaign content items associated with the content provider 108. Changed search behavior can include, for example, users who view campaign content item(s) being generally more likely to perform searches related to the content provider after viewing the campaign content item(s).

Figure 2:
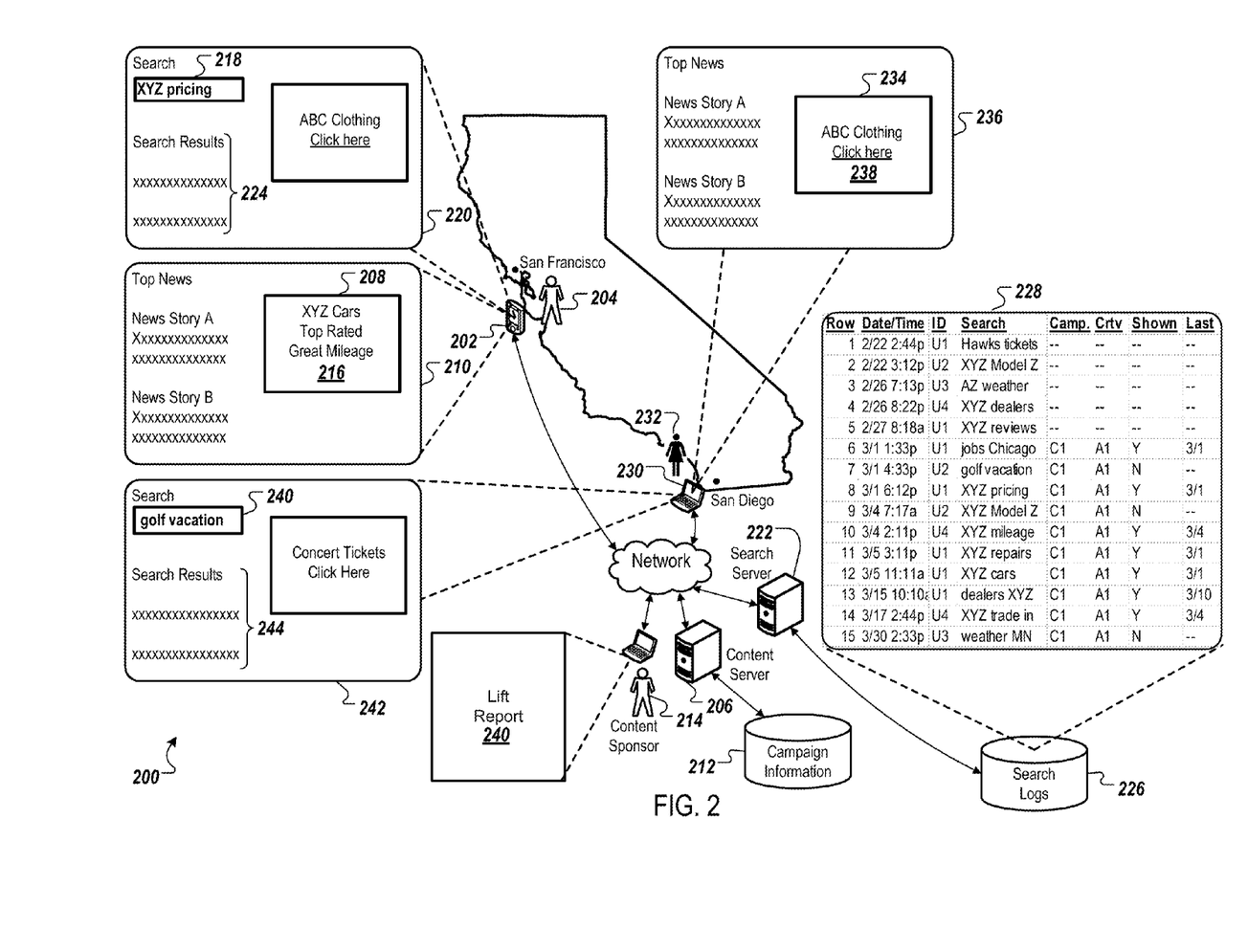
FIG. 2 is a block diagram of an example system for measuring lift.

FIG. 2 is a block diagram of an example system 200 for measuring lift. A user device 202 of a user 204 who is in San Francisco can submit a request for content to a content server 206 for a content slot 208 included on a publisher web page 210 presented on the user device 202. The content server 206 can determine eligible content items in response to the request for content received from the user device 202, such as by using an auction. For example, an auction-winning content item can be determined. The content server 206 can determine, such as based on information from a campaign datastore 212, that the auction-winning content item is associated with a campaign that has previously been designated (e.g., by a content sponsor 214) for a lift analysis.

For the lift analysis, the content server 206 can identify content requests, such as the content request received from the user device 202, for which a content item associated with the campaign is an eligible and intended (i.e., it won the auction or was deemed important to deliver to satisfy a reservation) content item. The content server 206 can determine to deliver a campaign content item to a first portion of these identified content requests and to not deliver the campaign content item to a second portion of these identified content requests. In some implementations, the first and the second portions are each fifty percent of the identified content requests. In some implementations, the first portion may be a different-sized portion than the second portion.

When the content server 206 determines that the content request received from the user device 202 is to be associated with the first portion, the content server 206 can determine to deliver the (e.g., auction-winning) content item to the user device 202 along with a first element (e.g., a pixel) that identifies the delivery of the content item. The first pixel can, for example, be an identifier that includes campaign information (e.g., campaign identifier, content group identifier), a content item identifier (e.g., a creative identifier), and an indication (e.g., a flag value) which indicates that the content item was delivered (as opposed to not being delivered and being substituted with another item). The delivered content item can be presented on the user device 202, as illustrated by a content item 216 presented in the content slot 208.

In this example, the content item 216 is a content item for "XYZ Cars" (e.g., the content sponsor 214 can be associated with an XYZ-brand car manufacturer). The content item 216 can be a brand content item, such as a content item displayed with a goal of building brand recognition rather than, for example, generating online conversions. The content sponsor 214 may have designated the campaign including the content item 216 for a lift analysis to measure effectiveness of brand content items such as the content item 216. Although the content item 216 is illustrated as a brand content item, the systems and methods described herein can be applied to content items that are not brand content items.

Effectiveness of the campaign that includes the content item 216 can be measured, for example, by evaluating searches made by users who have been presented the content item 216 (e.g., the user 204). For example, searches of such users made after being presented the content item 216 can be compared to searches of such users made before being presented the content item 216. For example, the user 204 may be more likely to perform searches relating to XYZ cars after viewing one or more of these content items, such as the content item 216, which promote XYZ cars. For example, the user 204 may enter a search query of "XYZ pricing" into a search control 218 that is included in a search page 220 presented on the user device 202. The search page 220 can be provided, for example, by a search server 222. In response to receiving a search request from the user device 202, the search server 222 can identify and provide search results to the user device 204, such as search results 224 presented on the search page 220.

The search request received from the user device 202 can include the first element (e.g., pixel) associated with the delivery of the content item 216. Information related to the search request, including the first pixel, can be stored in a search logs datastore 226. For example, as shown in a row eight of example log data 228, search information, such as a date and time of the search request, an identifier of the user 204 (e.g., "U1"), and the "XYZ pricing" search query, can be stored in the search logs datastore 226. Row eight also includes pixel information associated with the delivery of the content item 216, such as a campaign identifier (e.g., "C1"), a creative identifier for the content item 216 (e.g., "A1"), an indication that the content item 216 was presented to the user 204 (e.g., a "Y" flag value), and a date the content item 216 was last shown to the user 204 (e.g., "3/1").

In some implementations, the identifier of the user 204 stored in the search logs 226 (e.g., the "U1" identifier) can be an identifier of the user 204 which is associated with the search server 222 but which is not associated with the content server 206. For example, a cookie associated with the search server 222 can be stored for the user 204 on the user device 202. In some implementations, an identifier (e.g., cookie) of the user 204 that is associated with the content server 206 is also stored on the user device 202. In some implementations, to maintain a privacy policy of not directly linking user identifying information associated with the search server 222 to user identifying information associated with the content server 206, the pixel information associated with the delivery of the content item 216 will not include the identifier of the user 204 that is associated with the content server 206. For example, as shown in row eight of the example search log data 228, the pixel information includes a campaign identifier, a creative identifier, a shown-indicator, and a last-shown date, but does not include user-identifying information associated with the content server 206.

As another example of evaluating searches to measure effectiveness of a campaign, searches of users who have been presented the content item 216 can be compared to searches of users who have not been presented the content item 216. As described above, the content server 204 can determine to deliver a campaign content item associated with a campaign designated for a lift analysis to a first portion of identified content requests for which the campaign content item is eligible and can determine to not deliver the campaign content item to a second portion of the identified requests.

For example, the content server 206 can receive a content request from a user device 230 of a user 232 for a content slot 234 included in a web page 236. The content server 206 can determine eligible content items in response to the request for content received from the user device 230, and can determine, for example, that the content item 216 is an auction-winning content item. The content server 206 can determine, such as based on information from the campaign datastore 212, that the content item 216 is associated with a campaign that has previously been designated by the content sponsor 214 for a lift analysis. The content server 206 can determine to not deliver the content item 216 in response to the content request received from the user device 230.

The content server 206 can determine, for the content request received from the user device 230, to deliver a content item that is different than the content item 216. For example, the content server 206 can identify a content item that finished in second place in the auction. The content server 206 can deliver the identified content item to the user device 230, for presentation on the user device 230, as illustrated by a content item 238 presented in the content slot 234. In addition to delivering the content item 238, the content server 206 can deliver a second element (e.g., a pixel) that identifies the non-delivery of the content item 216.

In some implementations, the second pixel can be similar to the first pixel, in that the second pixel can include campaign information (e.g., campaign identifier, content group identifier), a content item identifier (e.g., a creative identifier) of the content item 216, and a flag value. The flag value for the second pixel, however, can indicate that the content item 216 was not delivered in response to the content request received from the user device 230. In some implementations, similar to the first pixel, the second pixel does not include an identifier of the user 232 that is associated with the content server 206.

The user 232 can perform searches after delivery of the content item 238 and the second pixel. For example, the user 232 may enter a search query of "golf vacations" into a search control 240 that is included in a search page 242 presented on the user device 230. The search page 242 can be provided, for example, by the search server 222. In response to receiving a search request from the user device 230, the search server 222 can identify and provide search results to the user device 230, such as search results 244 presented on the search page 240.

The search request received from the user device 230 can include the second element (e.g., pixel) associated with the previous non delivery of the content item 216. Information related to the search request, including the second pixel, can be stored in the search logs datastore 226. For instance, as shown in a row seven of the example log data 228, search information, such as a date and time of the search request, an identifier of the user 232 (e.g., "U2"), and the "golf vacation" search query, can be stored in the search logs datastore 226. The row seven also includes information associated with the second element and with non-delivery of the content item 216, such as a campaign identifier (e.g., "C1"), a creative identifier for the content item 216 (e.g., "A1"), and an indication that the content item 216 was not presented to the user 232 (e.g., an "N" flag value).

Evaluation of searches to measure effectiveness of a campaign associated with the content sponsor 214 can include evaluating the search logs 226. As mentioned, evaluating searches can include evaluating searches of users who have been presented a content item included in a campaign that has been designated for a lift analysis. For example, searches of such users made after being presented the campaign content item can be compared to searches of such users made before being presented the campaign content item. For example, with regards to the example log data 228, rows one and five indicate that the user 204 (e.g., "U1") performed two searches before having been presented the content item 216, with one of the two searches being related to "XYZ cars". Rows six, eight, eleven, twelve, and thirteen of the example log data 228 indicate that the user 204 performed five searches after being presented the content item 216, with four of the five searches being related to "XYZ cars".

By evaluating the search logs 226, the search server 222 can determine earliest and latest dates that a particular campaign content item has been presented to a user and how many times the campaign content item has been presented to the user. For example, the row six of the example log data 228 is an earliest log entry for the user 204 which includes information associated with the content item 216. For example, the row six includes pixel information including a campaign identifier (e.g., "C1"), a creative identifier for the content item 216 (e.g., "A1"), an indication that the content item 216 was presented to the user 204 (e.g., a "Y" flag value), and a date the content item 216 was last shown to the user 204 (e.g., "3/1"). The row thirteen indicates that the content item 216 was shown to the user 204 a second time (e.g., on a date of 3/10). As another example, row four of the example log data 228 indicates that a "U4" user performed a search related to "XYZ cars" on 2/26 before having been presented the content item 216, and rows ten and fourteen indicate that the "U4" user performed two searches for "XYZ cars" after being presented the content item 216.

The search server 222 can determine, based on the search logs 226, whether a user's search behavior changes after having been presented a campaign content item. For example, the search server 222 can determine a first likelihood that a user will perform searches related to the content sponsor 214 before presentation of the content item 216 and a second likelihood that a user will perform searches related to the content sponsor 214 after presentation of the content item 216. For example, the search server 222 can determine that 50% of the searches requested by the user 204 before being presented the content item 216 were related to the content sponsor 214 and that 80% of the searches requested by the user 204 after being presented the content item 216 were related to the content sponsor 214.

The search server 222 can determine information in the aggregate. For example, the search server 222 can determine an average first likelihood and an average second likelihood, for all users who have been presented the content item 216, of performing searches related to the content sponsor 214 before being presented the content item 216, and after being presented the content item 216, respectively. The search server 222 can determine other aggregate information, such as search volume. For example, the search server 222 can determine, for users who have been presented the content item 216, a first search volume of searches related to the content sponsor 214 before presentation of the content item 216 and a second search volume of searches related to the content sponsor 214 after presentation of the content item 216. As another example, the search server 222 can determine and compare rates of searches (e.g., searches per day, week, etc., related to the content sponsor 214, before and after presentation of the content item 216).

As another example, evaluating searches can include comparing searches of users who have been presented a particular content item included in a campaign designated for a lift analysis to searches of users who have not been presented the content item. For example, a probability of performing searches related to the content sponsor 214 by users who have been presented the content item 216 can be compared to a probability of performing searches related to the content sponsor 214 by users who have not been presented the content item 216. The search server 222 can also compare search volume and rate of search between users who have been presented the content item 216 and users who have not been presented the content item 216. The search server 222 can also determine a number of users who have recently performed searches related to the content sponsor 214 who otherwise previously had not performed searches related to the content sponsor 214. The search server 222 can determine a percentage of such users who were presented the content item 216 before performing search(es) related to the content sponsor 214.

The search server 222 (or the content server 206) can provide a lift report 240 to the content sponsor 214 which indicates effectiveness of the campaign that includes the content item 216. The lift report 240 can include various measurements and indications of lift, such as described above, including probability of performing relevant searches, search volume, search rate, etc., for users who have and have not been presented the content item 216, with corresponding confidence intervals for each measurement or indication. In some implementations, the content sponsor 214 can provide one or more dimensions for the lift report 240, such as a particular geographic area (e.g., San Diego, San Francisco, Calif.), a particular content group or content campaign, or a particular timeframe. In some implementations when a dimension is specified, information for the dimension can be presented in the lift report 240 when a user count associated with the dimension is large enough to ensure anonymity of users associated with the dimension.

Figure 3:
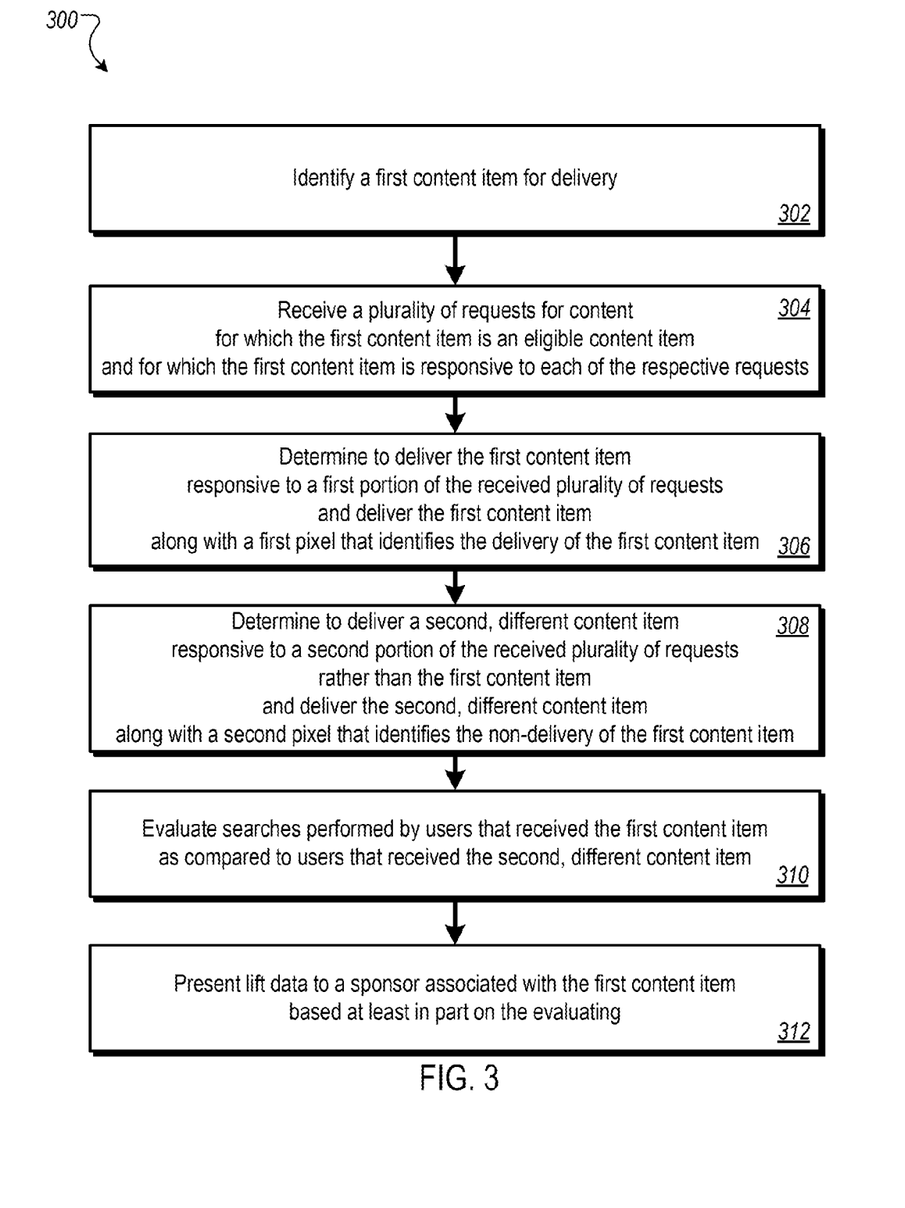
FIG. 3 is a flowchart of an example process for measuring lift.

FIG. 3 is a flowchart of an example process 300 for measuring lift. The process 300 can be performed, for example, by the content management system 110 and/or the search system 112 described above with respect to FIG. 1, or the content server 206 and/or the search server 222 described above with respect to FIG. 2.

A first content item is identified for delivery responsive to requests for content (302). The first content item can be for display in a slot on a page. For example, the first content item can be a brand content item and the slot can be associated with a display advertisement. As another example, the first content item can be a content item that is not a brand content item, such as a content item configured to generate conversions and not necessarily designed to promote a particular brand. The content server 206 can, for example, identify the content item 216.

A plurality of requests for content are received for which the first content item is an eligible content item and for which the first content item is responsive to each of the respective requests (304). For example, the content server 206 can receive a request for content for the content slots 208 and 234 for which the content item 216 is an eligible content item.

A determination is made to deliver the first content item responsive to a first portion of the received plurality of requests and the first content item is delivered along with a first element (e.g., a pixel) that identifies the delivery of the first content item (306). The first element can be, for example, a tracking pixel.

A determination is made to deliver a second, different content item responsive to a second portion of the received plurality of requests rather than the first content item and the second different content item is delivered along with a second element (e.g., pixel) that identifies the non-delivery of the first content item (308).

The first pixel and the second pixel can include, for example, metadata related to the first content item. For example, the metadata can include campaign information (e.g., campaign identifier, content group identifier) and a content item identifier (e.g., a creative identifier). The first pixel can include, for example, data (e.g., a flag value) which indicates that the first content item was delivered. The second pixel can include data which indicates that the first content item was not delivered. In some implementations, pixel data is provided along with a cookie when a user performs a search after delivery of a given pixel. The cookie can be associated, for example, with a search system and not associated with a content delivery system which delivered the first content item.

In some implementations, the first portion and the second portion are a same size. In some implementations, the first portion is a different size than the second portion. In some implementations, determining to deliver the first content item and second content item includes a predetermined number of deliveries in a time period specified by the sponsor. For example, the content management system 110 may be configured to deliver a predetermined number of 10,000 impressions of the first content item per week. The content management system 110 can take into account progress towards the predetermined number of deliveries when determining whether to deliver the first content item in response to a particular request. The size of the first portion and the size of the second portion can be selected to ensure statistical significance of subsequent evaluation of search results using the first pixel and the second pixel. For example, the size of the first portion and the size of the second portion can each be in the order of magnitude of thousands of associated content requests.

Interactions (e.g., searches) performed by users that received the first content item are evaluated as compared to users that received the second different content item (310). The evaluating of the searches can include using the first pixel and second pixel in evaluating search logs associated with search requests performed by users. For example, the search logs can be for searches performed by a user identified using the first or second pixel.

Evaluation of searches can include, for example, evaluating searches performed after delivery or non-delivery of the first content item. As another example, evaluation of searches can include evaluating pre-delivery searches performed prior to delivery or non-delivery and comparing the pre-delivery searches with searches performed after delivery or non-delivery of the first content item.

Lift data is presented to a sponsor associated with the first content item based at least in part on the evaluating (312). For example, the lift report 240 can be presented to the content sponsor 214. As another example, a lift report 450 (described below with respect to FIG. 4B) can be presented to a content sponsor.

Figure 4A:
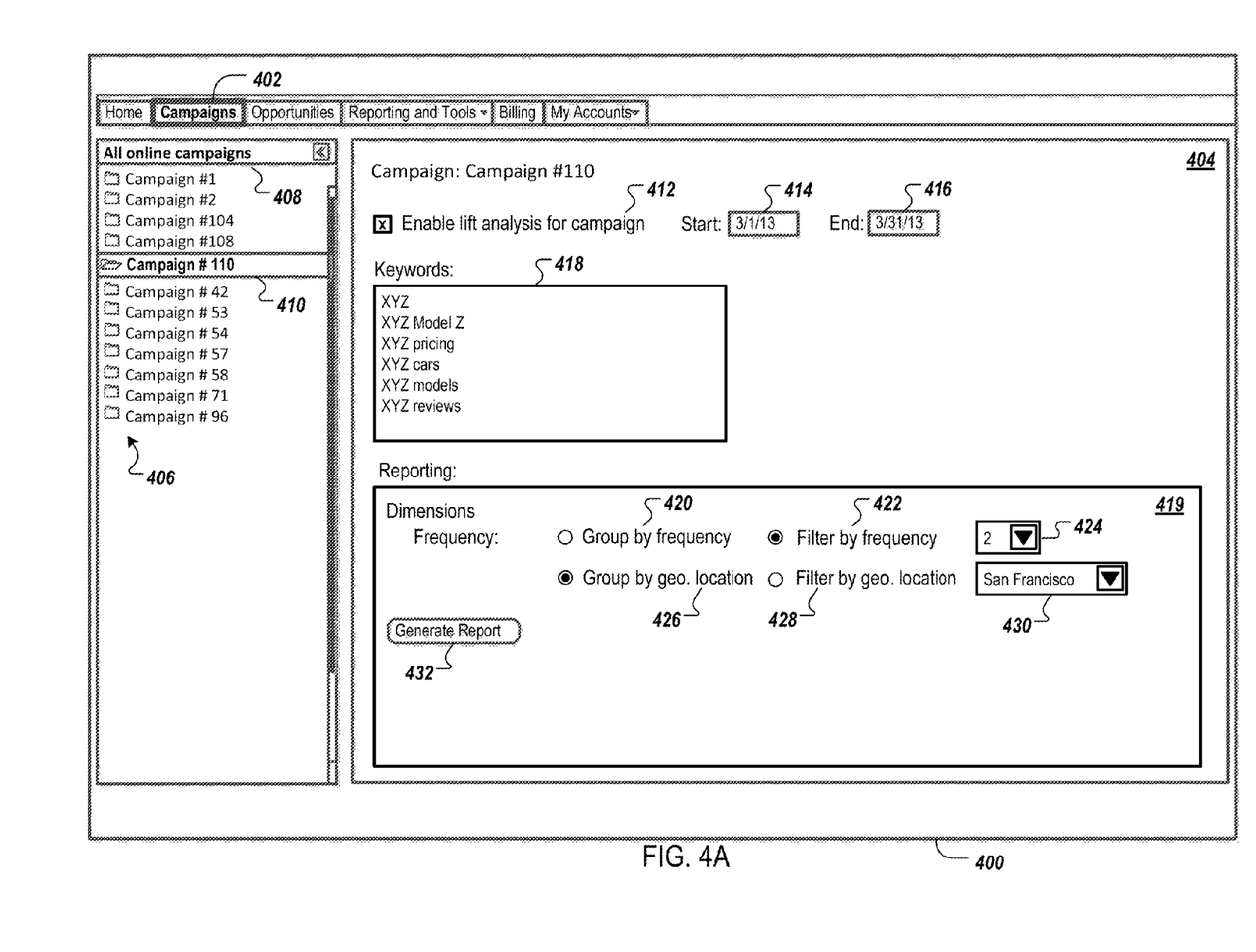
FIG. 4A illustrates an example campaign management user interface.

FIG. 4A illustrates an example campaign management user interface 400. The user interface 400 can be included, for example, in one or more user interfaces that a user, such as a campaign sponsor, can use to configure a campaign. The sponsor can select a tab 402 to display a campaign configuration area 404. The sponsor can view a list 406 of campaigns by selecting a control 408. The sponsor can edit an existing campaign in the campaign configuration area 404 by selecting the name of an existing campaign (e.g., a name 410) in the campaign list 406.

The sponsor can enable lift analysis for a campaign by selecting a control 412. Start and end dates for the lift analysis can be specified by the sponsor using controls 414 and 416, respectively. Suggested keywords associated with the sponsor, for use in identifying searches related to the sponsor, can be presented in a keyword list 418. Keywords can be identified, for example, from one or more of keywords supplied by the sponsor for the lift analysis, keywords previously associated with the selected campaign (e.g., selection keywords for content items included in the campaign), and automatically identified keywords. Keywords can be automatically identified, for example, by the content management system 110. For instance, the content management system 110 can automatically identify keywords that are related to sponsor-specified keywords or to selection keywords. As another example, the content management system 110 can automatically identify keywords that are associated with the content sponsor. The user can accept some or all suggested keywords presented in the keyword list 418. Additionally, the user can enter other keywords into the keyword list 418.

The sponsor can configure dimensions for use in reporting lift information using a reporting area 419. For example, the sponsor can specify to group or filter a report by frequency using controls 420 and 422, respectively. When the sponsor selects the control 422 to filter by frequency, the sponsor can specify a particular frequency using a control 424. Frequency refers to a number of times a campaign content item is delivered or not-delivered to a user. For example, if the content sponsor selects a frequency of two using the control 424, a generated report can include information related to users to which a campaign content item was delivered (or not-delivered) two times. In some implementations, selecting a frequency of two using the control 424 can result in information in a generated report including information relating to users who had been presented (or not presented) a campaign content item two or more times.

The sponsor can select controls 426 or 428 to group or filter by a particular geographic location, respectively. A geographic location can be, for example, a city, state, metropolitan area, country, or some other geographic location. If the sponsor selects the control 428 to filter by geographic location, a particular geographic location (e.g., San Francisco) can be selected or specified using a control 430. The sponsor can select a control 432 to generate a report that is generated based on current selections in the reporting area 419. Other reporting dimensions, such as filtering or grouping by creative, viewability, language, publisher, etc., can be provided.

Figure 4B:
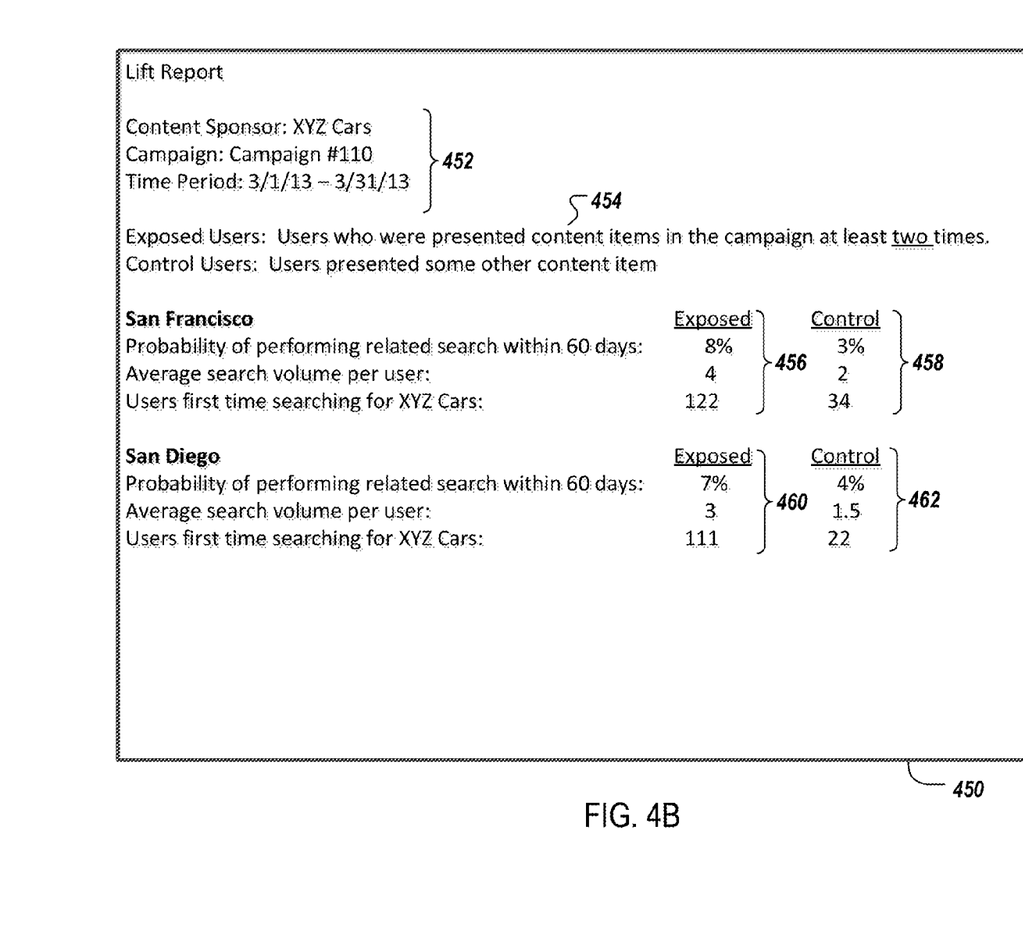
FIG. 4B illustrates an example report.

FIG. 4B illustrates an example report 450. A section 452 indicates that the report 450 is for the "XYZ Cars" sponsor, for a "campaign 110" campaign, and for a time period of Mar. 1, 2013 to Mar. 31, 2013. A note 454 describes that exposed users to which the report 450 relates are users who were presented content items from the "campaign 110" campaign at least two times (e.g., corresponding to the sponsor selection of the control 424). The note 454 also describes that control users to which the report 450 relates are users to which campaign content items were not presented.

The example report 450 is grouped by geographic area. A section 456 includes information relating to exposed users from the San Francisco area. For example, the report 450 indicates a probability of 8% that an exposed San Francisco user performs a search related to the "XYZ Cars" sponsor within sixty days of having been presented two content items from the campaign. Other information in the section 456 indicates that an average search volume of four related searches occurred for exposed San Francisco users in the time period of the report 450 and that one hundred twenty two exposed San Francisco users performed searches relating to "XYZ Cars" where those users had not previously not performed searches relating to "XYZ Cars".

A section 458 includes information similar to the section 456 but for control (e.g., unexposed) San Francisco users (e.g., those users for which a different content item was presented in place of a campaign content item). For example, information in the section 458 indicates a probability of 3% that a control user performs a search related to the "XYZ campaign" after being presented the different content item(s), a search volume of two searches relating to "XYZ Cars" during the time period of the report 450 for control users, and that thirty four control users performed searches relating to "XYZ Cars" where those users had not previously performed searches relating to "XYZ Cars". Sections 460 and 462 include information similar to the sections 456 and 458, respectively, but for San Diego rather than San Francisco.

Figure 5:
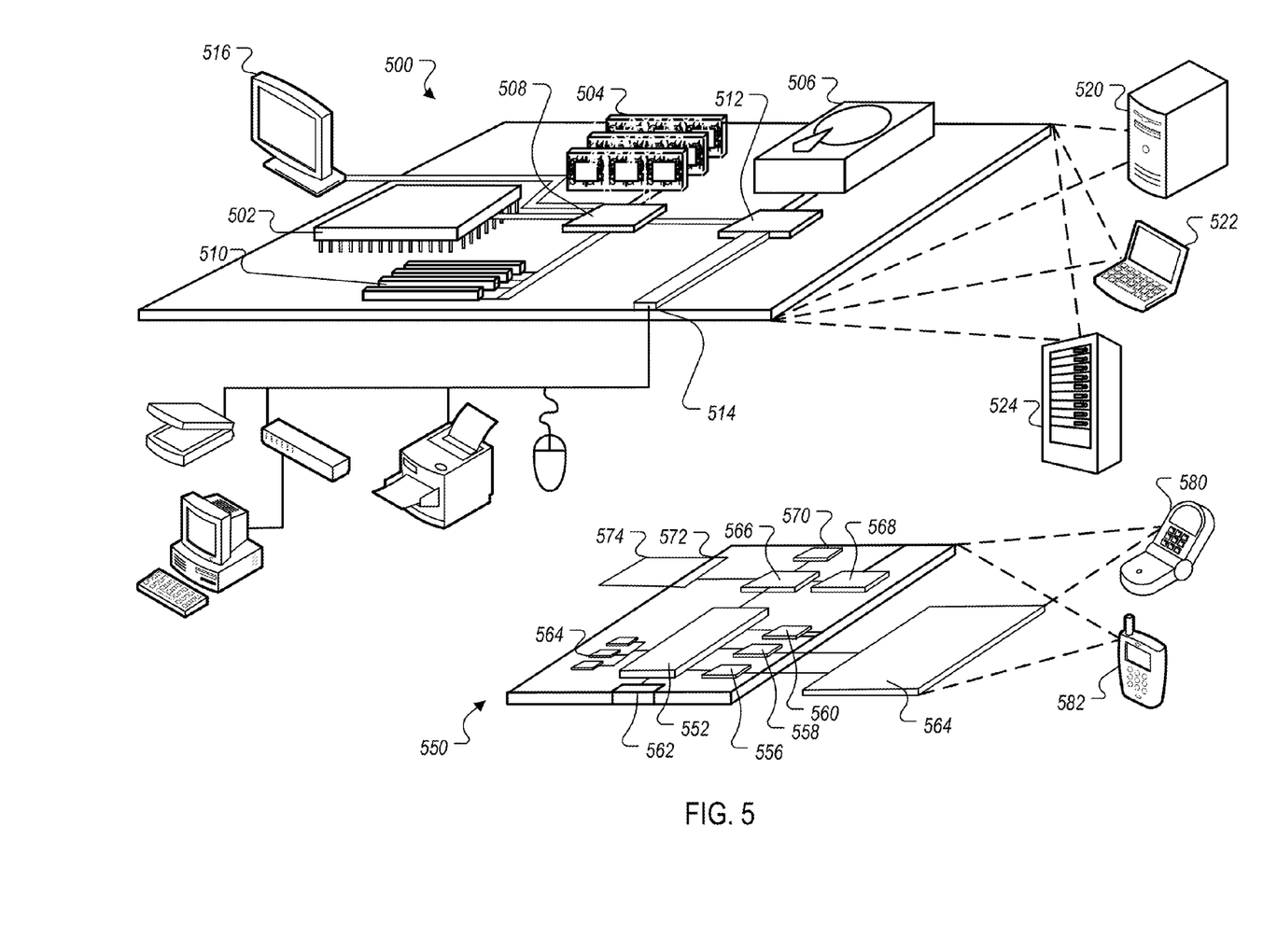
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
receiving a plurality of requests for content for which a first content item is an eligible content item and for which the first content item is responsive to each of the respective requests;
determining to deliver, to first user devices each comprising a first identifier associated with a content system and a second identifier associated with a search server, the first content item responsive to a first portion of the received plurality of requests, and delivering the first content item along with a first pixel that identifies the delivery of the first content item while determining not to deliver the first content item responsive to a second different portion of the received plurality of requests, wherein the first pixel includes an identifier for the first content item, an indicator of exposure to the first content item and does not include the first identifiers of the first user devices associated with the content system so that user identifying information associated with the content system is not linked to user identifying information associated with the search server;
determining to deliver, to second user devices each comprising the first identifier and the second identifier, a second different content item responsive to the second different portion of the received plurality of requests rather than the first content item and delivering the second different content item along with a second pixel that identifies the non-delivery of the first content item, wherein the second pixel includes an identifier for the first content item, an indicator of non-exposure to the first content item and does not include the first identifiers of the second user devices associated with the content system so that user identifying information associated with the content system is not linked to user identifying information associated with the search server, wherein each first identifier and each second identifier are associated with a user of at least one of the first user devices or the second user devices;
evaluating searches performed by the first user devices that received the first content item as compared to the second user devices that received the second different content item including using the first pixel and second pixel in evaluating search logs associated with search requests performed by the first and the second user devices; and
presenting lift data to a sponsor associated with the first content item based at least in part on the evaluating.

2. The method of claim 1 wherein the first content item is a brand content item and wherein a slot that is to present the first content item is associated with a display advertisement.

3. The method of claim 1 wherein the first and the second content items are advertisements.

4. The method of claim 1 wherein determining to deliver the first content item and second content item includes a predetermined number of deliveries in a time period specified by the sponsor.

5. The method of claim 1 wherein evaluating searches includes evaluating searches performed after delivery or non-delivery of the first content item.

6. The method of claim 1 wherein evaluating searches includes evaluating pre-delivery searches performed prior to delivery or non-delivery and comparing the pre-delivery searches with searches performed after delivery or non-delivery of the first content item.

7. The method of claim 1 further comprising providing a user interface for receipt of campaign parameters associated with the first content item, and receiving an indication to include the first content item in a lift analysis along with data related to the lift analysis.

8. The method of claim 7 wherein the campaign parameters include keywords for evaluating lift in the searches performed by users that were delivered or not delivered the first content item.

9. A computer program product tangibly embodied in a computer-readable storage device and comprising instructions that, when executed by a processor, cause the processor to:
receive a plurality of requests for content for which a first content item is an eligible content item and for which the first content item is responsive to each of the respective requests;
determine to deliver, to first user devices each comprising a first identifier associated with a content system and a second identifier associated with a search server, the first content item responsive to a first portion of the received plurality of requests, and delivering the first content item along with a first pixel that identifies the delivery of the first content item while determining not to deliver the first content item responsive to a second different portion of the received plurality of requests, wherein the first pixel includes an identifier for the first content item, an indicator of exposure to the first content item and does not include the first identifiers of the first user devices associated with the content system so that user identifying information associated with the content system is not linked to user identifying information associated with the search server;
determine to deliver, to second user devices each comprising the first identifier and the second identifier, a second different content item responsive to the second different portion of the received plurality of requests rather than the first content item and delivering the second different content item along with a second pixel that identifies the non-delivery of the first content item, wherein the second pixel includes an identifier for the first content item, an indicator of non-exposure to the first content item and does not include the first identifiers of the second user devices associated with the content system so that user identifying information associated with the content system is not linked to user identifying information associated with the search server, wherein each first identifier and each second identifier are associated with a user of at least one of the first user devices or the second user devices;
evaluate searches performed by the first user devices that received the first content item as compared to the second user devices that received the second different content item including using the first pixel and second pixel in evaluating search logs associated with search requests performed by the first and the second user devices; and
present lift data to a sponsor associated with the first content item based at least in part on the evaluating.

10. The product of claim 9 wherein the first content item is a brand content item and wherein a slot that is to present the first content item is associated with a display advertisement.

11. The product of claim 9 wherein the first and second content items are advertisements.

12. The product of claim 9 wherein determining to deliver the first content item and second content item includes a predetermined number of deliveries in a time period specified by the sponsor.

13. A system comprising:
a content management system; and
a search system;
wherein the content management system is configured to:
receive a plurality of requests for content for which a first content item is an eligible content item and for which the first content item is responsive to each of the respective requests;
determine to deliver, to first user devices each comprising a first identifier associated with a content management system and a second identifier associated with a search system, the first content item responsive to a first portion of the received plurality of requests, and delivering the first content item along with a first pixel that identifies the delivery of the first content item while determining not to deliver the first content item responsive to a second different portion of the received plurality of requests, wherein the first pixel includes an identifier for the first content item, an indicator of exposure to the first content item and does not include the first identifiers of the first user devices associated with the content management system so that user identifying information associated with the content management system is not linked to user identifying information associated with the search system;
determine to deliver, to second user devices each comprising the first identifier and the second identifier, a second different content item responsive to the second different portion of the received plurality of requests rather than the first content item and delivering the second different content item along with a second pixel that identifies the non-delivery of the first content item, wherein the second pixel includes an identifier for the first content item, an indicator of non-exposure to the first content item and does not include the first identifiers of the second user devices associated with the content management system so that user identifying information associated with the content management system is not linked to user identifying information associated with the search system, wherein each first identifier and each second identifier are associated with a user of at least one of the first user devices or the second user devices, and
wherein the search system is configured to:
evaluate searches performed by the first user devices that received the first content item as compared to the second user devices that received the second different content item including using the first pixel and second pixel in evaluating search logs associated with search requests performed by the first and second user devices; and
present lift data to a sponsor associated with the first content item based at least in part on the evaluating.

14. The system of claim 13 wherein the first content item is a brand content item and wherein a slot that is to present the first content item is associated with a display advertisement.

15. The system of claim 13 wherein the first and the second content items are advertisements.

16. The system of claim 13 wherein determining to deliver the first content item and second content item includes a predetermined number of deliveries in a time period specified by the sponsor.

* * * * *